United States Patent
Triller (10) Patent No.: US 8,235,848 B2
(45) Date of Patent: *Aug. 7, 2012

(54) VEHICLE TRANSMISSION HAVING CONTINUOUSLY VARIABLE TRANSMISSION RATIO

(75) Inventor: Andreas Triller, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/106,024

(22) Filed: May 12, 2011

(65) Prior Publication Data

US 2011/0244998 A1 Oct. 6, 2011

Related U.S. Application Data

(63) Continuation of application No. PCT/DE2009/001486, filed on Oct. 22, 2009.

(30) Foreign Application Priority Data

Nov. 19, 2008 (DE) .......................... 10 2008 058 081

(51) Int. Cl.
*F16H 9/16* (2006.01)

(52) U.S. Cl. ........................................................ 474/8
(58) Field of Classification Search .................. 474/8–28
See application file for complete search history.

(56) References Cited

U.S. PATENT DOCUMENTS

| | | | | | |
|---|---|---|---|---|---|
| 4,630,504 | A | * | 12/1986 | Smirl | 474/8 |
| 4,740,191 | A | * | 4/1988 | Takano et al. | 474/69 |
| 5,031,481 | A | * | 7/1991 | Algrain et al. | 477/45 |
| 5,468,192 | A | * | 11/1995 | Robbins | 474/28 |
| 7,815,537 | B2 | * | 10/2010 | Triller et al. | 475/210 |
| 2009/0017959 | A1 | * | 1/2009 | Triller | 475/210 |

FOREIGN PATENT DOCUMENTS

| | | |
|---|---|---|
| DE | 879 350 C | 6/1953 |
| DE | 41 19 291 A1 | 12/1992 |

* cited by examiner

*Primary Examiner* — Michael Mansen
*Assistant Examiner* — Michael Riegelman
(74) *Attorney, Agent, or Firm* — Lucas & Mercanti, LLP; Klaus P. Stoffel (57) ABSTRACT

A vehicle transmission with continuously variable transmission ratios, which has a first conical disk pair arranged on a first shaft, and a second conical disk pair arranged on a second shaft, a belt arranged between the conical disk pairs, and an input shaft which has an output wheel mounted rotatably thereon. The input shaft can optionally be rotationally engaged with the first or second shaft and the output wheel can be rotationally engaged with the respectively other shaft. Also, a multi-disk clutch transmits a rotational force between the input shaft and the first or second shaft and the output wheel can be rotationally engaged with the other shaft by way of a dog clutch. The first multi-disk clutch and the first dog clutch can be actuated by a first hydraulically actuated device and the second multi-disk clutch and the second dog clutch can be actuated by a second hydraulically actuated device.

11 Claims, 8 Drawing Sheets

Fig 1

|  | $K_R$ | $K_1$ | $K_4$ | $K_2$ | $K_3$ |
|---|---|---|---|---|---|
| R | X | X | - | - | - |
| N | - | - | - | - | - |
| Low | - | - | X | X | - |
| High | - | X | - | - | X |

VEHICLE TRANSMISSION HAVING CONTINUOUSLY VARIABLE TRANSMISSION RATIO

This application is a continuation of PCT/EP2009/001486 filed Oct. 22, 2009, which in turn claims the priority of DE 10 2008 058 081.3 filed Nov. 19, 2008, the priority of both applications is hereby claimed and both applications are incorporated by reference herein.

FIELD OF THE INVENTION

The present invention relates to a vehicle transmission having a continuously variable transmission ratio, with a first cone-pulley pair arranged on a first shaft and a second cone-pulley pair arranged on a second shaft and an endless chain belt arranged between the cone-pulley pairs and an input shaft and an output wheel mounted rotatably thereon, wherein the input shaft can be brought into engagement either with the first shaft or the second shaft, and the output wheel can be brought into rotational engagement with the other shaft in each case, and respective multi-disk clutches for transmitting rotational force are provided between the input shaft and first shaft and second shaft, and the output wheel can be brought into rotational engagement with the other shaft by means of a respective dog clutch.

BACKGROUND OF THE INVENTION

A vehicle transmission having a continuously variable transmission ratio has been disclosed by U.S. application 60/999,964 belonging to the Applicant.

The transmission involves an "$i^2$-red transmission," wherein "i" indicates the transmission ratio of a variator of a continuously variable cone-pulley transmission and the "2" indicates that the variator transmission region is passed through twice.

This makes it possible to achieve a transmission having a large spread, which can transmit a high driving torque.

Although the above-described transmission has already proven successful, it has the disadvantage of a relatively complex construction, since it has a total of five clutches, of which one clutch is assigned to the reverse driving range, but four clutches alone are required in order to pass twice through the spread of the continuously variable cone-pulley transmission. Said clutches have to be correspondingly activated, which results in complicated switching operations. The four clutches are multi-disk clutches which each have to be activated by a dedicated actuating mechanism.

A transmission having a drive and output unit has also already been disclosed, in which an output gearwheel is arranged rotatably on a drive shaft via which an input torque can be introduced into the transmission. The output gearwheel is flanked on both sides by a clutch unit which has a multi-disk clutch and a dog clutch which can be brought alternately into engagement with the output gearwheel, thus enabling torque to be transmitted from the particular clutch unit to the output gearwheel. Even in the case of this known drive and output unit, the multi-disk clutches and dog clutches are each activated by an independent actuating mechanism. An activating means of this type is naturally complicated in terms of components and is therefore expensive.

Proceeding therefrom, the present invention is now based on the object of simplifying the vehicle transmission of the type in question in respect of the construction thereof and therefore also the activation of the individual transmission components which transmit rotational force.

SUMMARY OF THE INVENTION

The invention provides a vehicle transmission having a continuously variable transmission ratio, with a first cone-pulley pair arranged on a first shaft and a second cone-pulley pair arranged on a second shaft and an endless chain belt arranged between the cone-pulley pairs and an input shaft with an output wheel mounted rotatably thereon, wherein the input shaft can be brought into rotational engagement either with the first shaft or the second shaft, and the output wheel can be brought into rotational engagement with the other shaft in each case, and respective multi-disk clutches for transmitting rotational force are provided between the input shaft and first shaft and second shaft, and the output wheel can be brought into rotational engagement with the other shaft by means of a respective dog clutch, wherein the first multi-disk clutch and the first dog clutch can be actuated by means of a first hydraulically actuated device, and the second multi-disk clutch and the second dog clutch can be actuated by means of a second hydraulically actuated device.

The vehicle transmission according to the invention therefore has a substantially simpler actuation of the multi-disk clutches and dog clutches, since a multi-disk clutch and a dog clutch are in each case combined to form a clutch unit which can be actuated by a hydraulically actuated device. In order to actuate the four clutches provided for passing twice through the forwards driving range, only two hydraulically actuated devices are therefore required in the vehicle transmission according to the invention.

According to a development of the invention, the two hydraulically actuated devices can he acted upon with hydraulic fluid by means of two fluid lines extending coaxially along the input shaft. This means in other words that the input shaft has two fluid lines through which hydraulic fluid can be conducted, for example by means of a pump device, or through which the hydraulic fluid contained therein can be pressurized and said pressurization can result in the displacement of an actuating device which closes or opens the multi-disk clutch and the dog clutch in order to transmit torque.

According to a development of the invention, the hydraulic fluid can be applied by means of two rotary inlets arranged in fluid communication with the input shaft. Therefore, hydraulic fluid can he supplied to or removed from the two devices through the two rotary inlets or the hydraulic fluid present in the two devices and the fluid lines can be pressurized via the two rotary inlets or the pressure caused by the pressurization in the two hydraulically actuated devices and the fluid lines can he reduced via the rotary inlets.

The two rotary inlets therefore have to be fluidically connected only via a fluid line or the like to a device which ensures the build-up of pressure and dissipation of pressure in the hydraulically actuated devices.

According to a development of the invention, each of the devices has a pressure space which can act upon a component for closing the multi-disk clutch so as to displace said component axially relative to the input shaft counter to a spring device. The build-up of pressure in the pressure space can ensure axial displacement of the component, and the component can close the multi-disk clutch in order to transmit torque. If the pressure in the pressure space is reduced, the spring device ensures axial displacement of the component relative to the input shaft and therefore an interruption in the transmission of torque via the previously closed multi-disk clutch.

According to a development of the invention, the above-described component for closing the multi-disk clutch can be provided with an engagement section, and the engagement section can be brought into a releasable, non-rotatable form-fitting engagement with the output wheel, and the engagement section can be prestressed in the direction of the output wheel by means of a spring device. This means, in other words, that the component is in a form-fitting engagement with the output wheel in a state of the pressure space in which the latter is supplied with little, if any, pressure and said component can rotate together with the output wheel.

If the pressure space is pressurized, this results in opening of the form-fitting engagement between the output wheel and the component and, via the axial displacement of the component relative to the input shaft, in closing of the corresponding multi-disk clutch.

According to a development of the invention, the spring device is supported against a gearwheel which is arranged rotatably on the input shaft between the multi-disk clutch and the spring device. Said gearwheel can be in rotationally fixed engagement with the multi-disk clutch, for example via an undercut axial toothing or else very simply via a welded connection, and therefore, when the multi-disk clutch is closed, torque is transmitted to the gearwheel and torque can be transmitted from the latter to a gearwheel arranged on the first or second shaft for rotation therewith.

Therefore, according to the invention, the axial displacement of the component in the operative direction for closing the multi-disk clutch leads to opening of the engagement position between the component and the output wheel. Since the other multi-disk clutch in each case is in the open state, the dog clutch of said other multi-disk clutch is in form-fitting engagement with the output gearwheel, and therefore torque can be correspondingly transmitted from the gearwheel arranged between said other multi-disk clutch and the dog clutch to the output wheel.

As has already been mentioned above, the gearwheel is arranged in the axial direction of the input shaft between the component and the multi-disk clutch. In a development of the invention, the gearwheel has recesses in the axial longitudinal direction which are penetrated by dogs which extend away from the component in the axial direction and are designed to act upon disks of the multi-disk clutch.

The component can therefore be displaced axially on the input shaft via the pressure space relative to the gearwheel and to the multi-disk clutch, and the dogs can act upon the disks of the multi-disk clutch in order to close the multi-disk clutch. If the pressure in the pressure space is reduced, the spring device ensures axial displacement of the component and therefore of the dogs thereof away from the disks of the multi-disk clutch and therefore ensures opening of the multi-disk clutch.

Finally, the invention also provides a further clutch arranged for transmitting rotational force from the second shaft to a turning stage arranged in rotational engagement with the output wheel. If said clutch is closed, torque is transmitted from the second shaft to the turning stage which is in rotational engagement with the output wheel. Said driving position corresponds to the reverse driving position of the vehicle transmission according to the invention.

BRIEF DESCRIPTION OF THE DRAWINGS

The invention is explained in more detail below with reference to the drawing, in which.

DETAILED DESCRIPTION OF THE INVENTION

Figure 1:
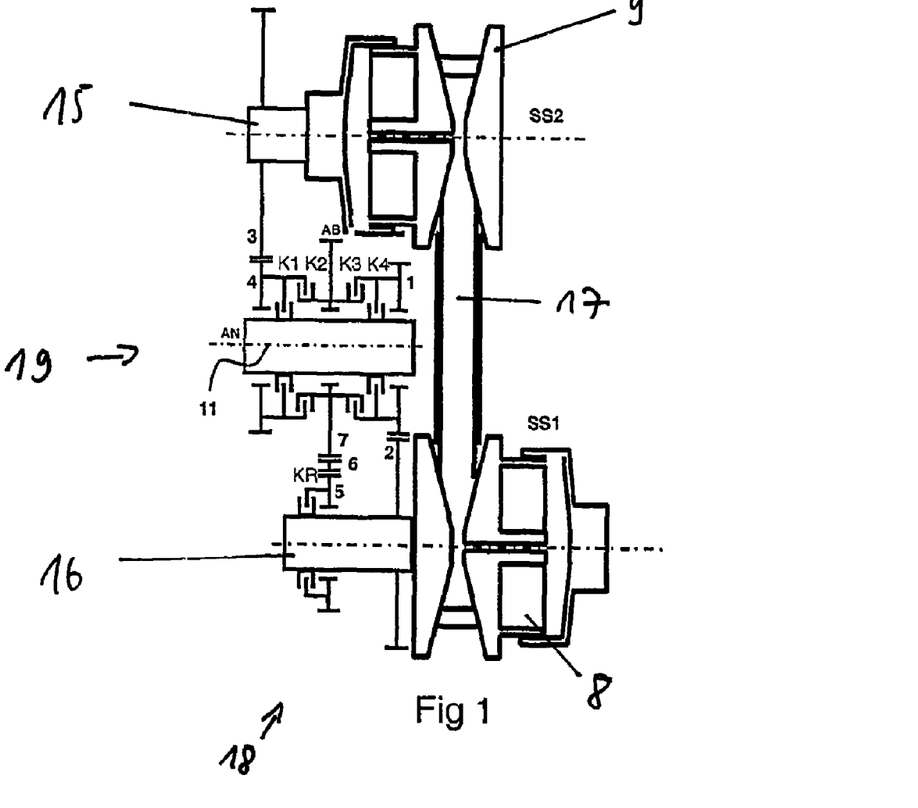
FIG. 1 shows a schematic illustration of the construction of an embodiment of the vehicle transmission according to the invention and a matrix of the positions of clutches provided in the vehicle transmission.

FIG. 1 of the drawing shows a schematic illustration of an embodiment of the vehicle transmission 1 according to the invention.

The vehicle transmission 18 has a first cone-pulley pair 9 arranged on a first shaft 15 and a second cone-pulley pair 8 arranged on a second shaft 16. An endless chain belt 17 in the form of, for example, a plate link chain is arranged between the two cone-pulley pairs 8, 9.

A driving torque originating from a drive motor (not illustrated specifically) can be introduced into the vehicle transmission 18 via an input shaft 11. A gearwheel 4 via which a torque can be introduced into a gearwheel 3 arranged on the first shaft 15 for rotation therewith is arranged rotatably on the input shaft 11.

Figure 5:
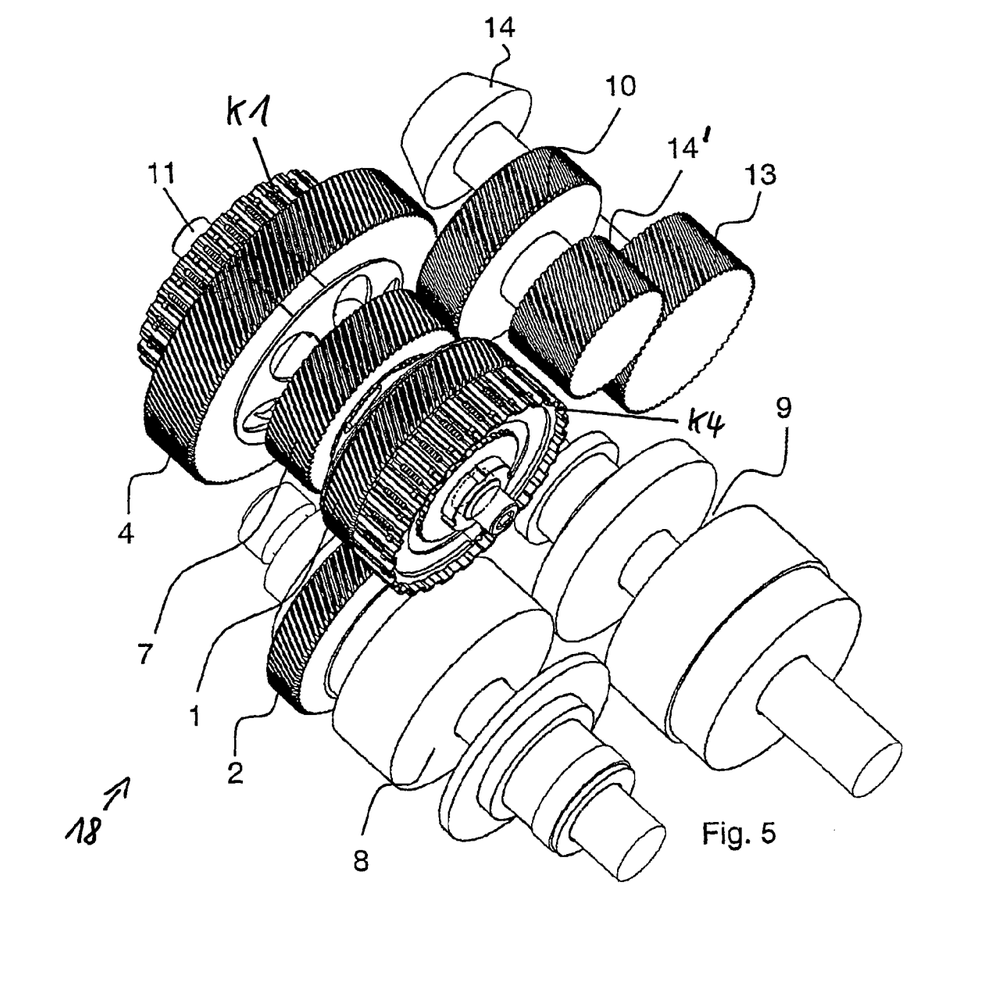
FIG. 5 shows a perspective schematic illustration of an implemented embodiment of the vehicle transmission according to the invention.

Furthermore, a gearwheel 1 via which a torque can be introduced from the input shaft 11 to a gearwheel 2 arranged on the second shaft 16 for rotation therewith is arranged rotatably on the input shaft 11. An output wheel 7 is arranged rotatably on the input shaft 11 and serves to dispense torque from the vehicle transmission 18 to a set of gearwheels 10, 13, 14, 14', which is illustrated in FIG. 5 of the drawing and can be part of a drive train (not illustrated specifically) of a vehicle.

A gearwheel 5 which via a reverse driving clutch KR can be coupled into the torque transmission is arranged rotatably on the second shaft 16. The gearwheel 5 is in engagement with a turning stage 6 and can transmit a torque from the second shaft 16 to the output gearwheel 7. During said transmission of torque, the vehicle transmission 18 according to the invention is in the reverse driving position.

The input shaft 11 is supplemented by the gearwheels 1, 4, 7 and the clutches K1, K2, K3 and K4 to form a drive and output unit 19.

As the matrix also illustrated in FIG. 1 shows, the vehicle transmission 18 according to the invention can take up four switching positions or driving positions. In the first driving position, which is denoted by "R," the reverse driving clutch KR and the clutch K1 are closed. In the neutral position "N," all of the clutches are open, in the "LOW" driving position the clutches K4 and K2 are closed, and in the "HIGH" driving position the clutches K1 and K3 are closed.

Figure 2:
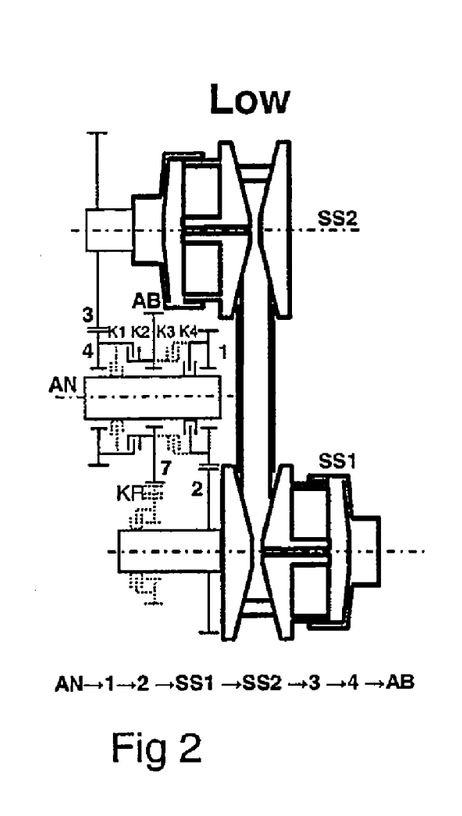
FIGS. 2-4 show illustrations of various driving ranges of the vehicle transmission according to the present invention.
Figure 3:
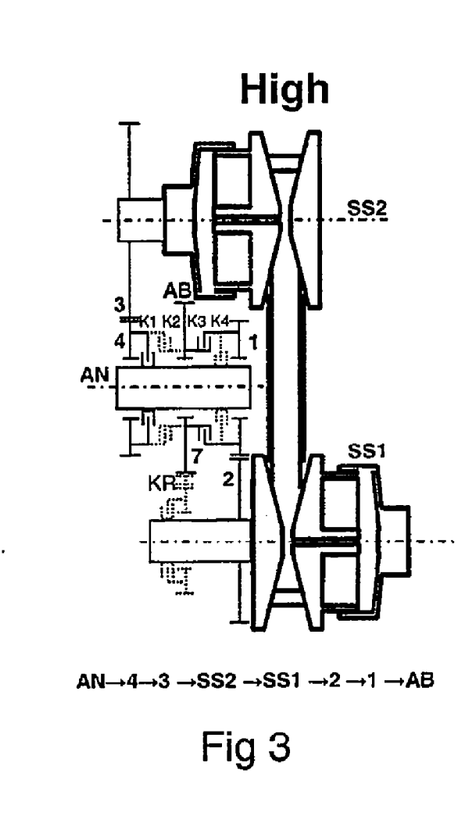
Figure 4:
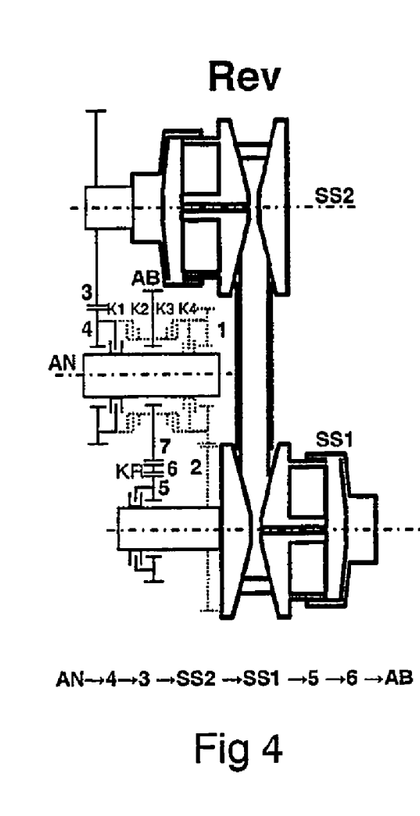

The respective driving positions of the vehicle transmission 18 according to the invention are illustrated in FIG. 2, FIG. 3 and FIG. 4 of the drawing.

FIG. 2 shows the "LOW" driving position in which force flows from the input shaft 11 via the closed clutch K4 and the gearwheel 1 to the gearwheel 2, from the second shaft 16 via the second cone-pulley pair 8 to the endless chain belt 17, from there to the first cone-pulley pair 9 and to the gearwheel 3 and from the gearwheel 3 to the gearwheel 4 and via the closed clutch K2 to the output wheel 7.

At the synchronizing point, a switch can be made to the "HIGH" driving position illustrated in FIG. 3. Torque is transmitted there via the closed clutch K1 to the gearwheel 4, and from there via the gearwheel 3 to the first shaft 15 and to the first cone-pulley pair 9.

A rotational force is transmitted via the endless chain belt 17 to the second cone-pulley pair 8 and from there to the second shaft 16. The rotational force is transmitted from the shaft 16 via the gearwheel 2 to the gearwheel 1 on the input shaft 11 and from there via the closed clutch K3 to the output wheel 7.

FIG. 4 of the drawing shows the reverse driving position "Rev" of the vehicle transmission 18 according to the invention.

The torque entered into the input shaft 11 is transmitted via the closed clutch K1 to the gearwheel 4, and from there to the gearwheel 2 and the first shaft 16. The rotational force is transmitted via the first cone-pulley pair 9 to the endless chain belt 17 and from there to the second cone-pulley pair 8 and the second shaft 16.

The rotational force is transmitted via the reverse driving clutch KR, which can be brought into force flux engagement with the second shaft 16, to a turning stage 6 which is in rotational engagement with the output gearwheel 7.

FIG. 5 of the drawing shows, in a perspective illustration, an implemented vehicle transmission 18 according to the present invention.

Figure 6:
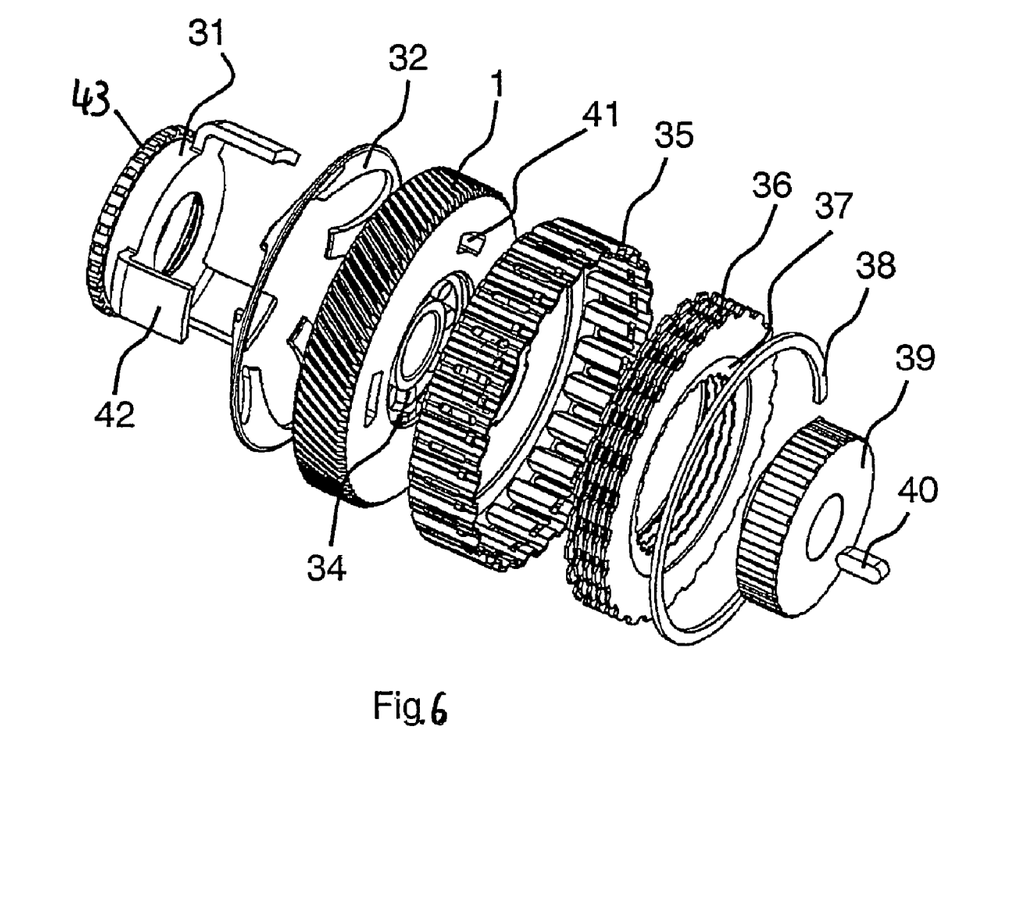
FIG. 6 shows a perspective exploded illustration of a clutch unit.

A multi-disk clutch K1 is fixed on the input shaft 11 for rotation therewith via an adjustment spring 40 which can be seen in FIG. 6 of the drawing.

A further multi-disk clutch K4 is likewise fixed on the input shaft 11 for rotation therewith. FIG. 6 of the drawing shows the respective construction of the multi-disk clutches K1 and K4. A dog rim part 31 which is axially displaceable on the input shaft 11 has dogs 42 which can penetrate into recesses 41 of the gearwheel 1 and can act via a clutch outer rim 35 on steel disks 36 and disks 37 in such a manner that rotational force is transmitted between the steel disks 36 and the disks 37.

The disks 37 have an internal toothing which is in engagement with an external toothing of an inner clutch rim 39 which is fixed on the input shaft 11 for rotation therewith via the adjustment spring 40.

Axial displacement of the dog rim part 31 results in the clutch outer rim 35 being pressurized and therefore in the multi-disk clutch K4 being closed.

The construction of the clutch K1 corresponds to the construction of the clutch K4 that is explained with reference to FIG. 6, with the difference that, instead of the gearwheel 1 which is arranged rotatably on the input shaft 11 via a bearing 34, the gearwheel 4 which can be seen with reference to FIG. 5 is provided.

Figure 7:
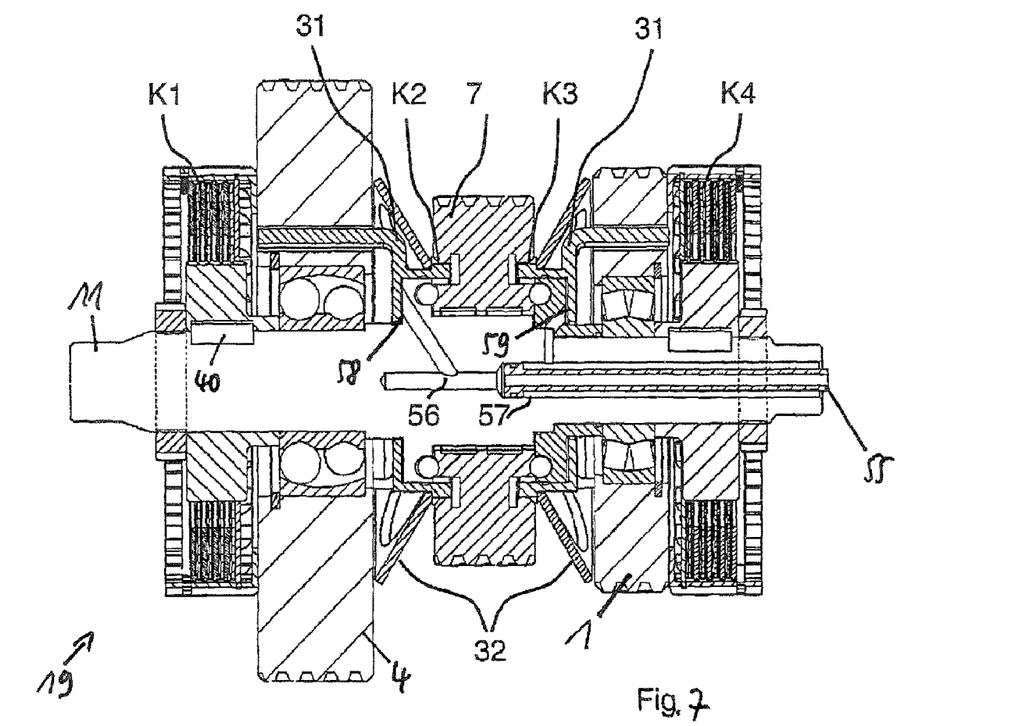
FIG. 7 shows a partially sectioned illustration of a drive and output unit of the vehicle transmission according to the invention in a neutral position.

FIG. 7 of the drawing shows the construction of the drive and output unit 19. The multi-disk clutch K1, which can be closed via the dog rim part 31, is arranged on the input shaft 11 for rotation therewith via the adjustment spring 40. The gearwheel 4 is welded to the clutch outer rim 35 such that the rotational movement of the clutch outer rim 35 is transmitted to the gearwheel 4 when the multi-disk clutch K1 is closed.

A disk spring 32 prestresses the dog rim part 31 in the direction of the output wheel 7, and the dog rim part 31 has a toothing 43 which is in engagement with an internal toothing formed on the output wheel 7 and therefore forms a first dog clutch K2 together with the internal toothing.

The output wheel 7 has a second internal toothing which forms a second dog clutch K3 with a toothing 43 of the second dog rim part 31. The clutch outer rim 35 of the second multi-disk clutch K4 can be acted upon via the second dog rim part 31 in order to close said multi-disk clutch. The second disk spring 32 prestresses the dog rim part 31 in the direction of the driving wheel 7 such that the toothing 43 of the dog rim part 31 is in engagement with the toothing of the output wheel 7.

The input shaft 11 has two fluid lines 56, 57 which are arranged coaxially with respect to each other and are separated from each other via a pipe 55 provided with a seal. Hydraulic fluid can be fed into a pressure space 58 via the fluid line 56. In a similar manner, hydraulic fluid can be fed into a pressure space 59 via the fluid line 57. FIG. 7 shows the position of the drive and output unit 19 in the neutral position of the vehicle transmission 18 according to the invention.

Two rotary inlets (not illustrated specifically) via which hydraulic fluid can be introduced into the fluid lines 56, 57 can be arranged at that end of the input shaft 11 which is on the rear side of the clutch K1.

Figure 8:
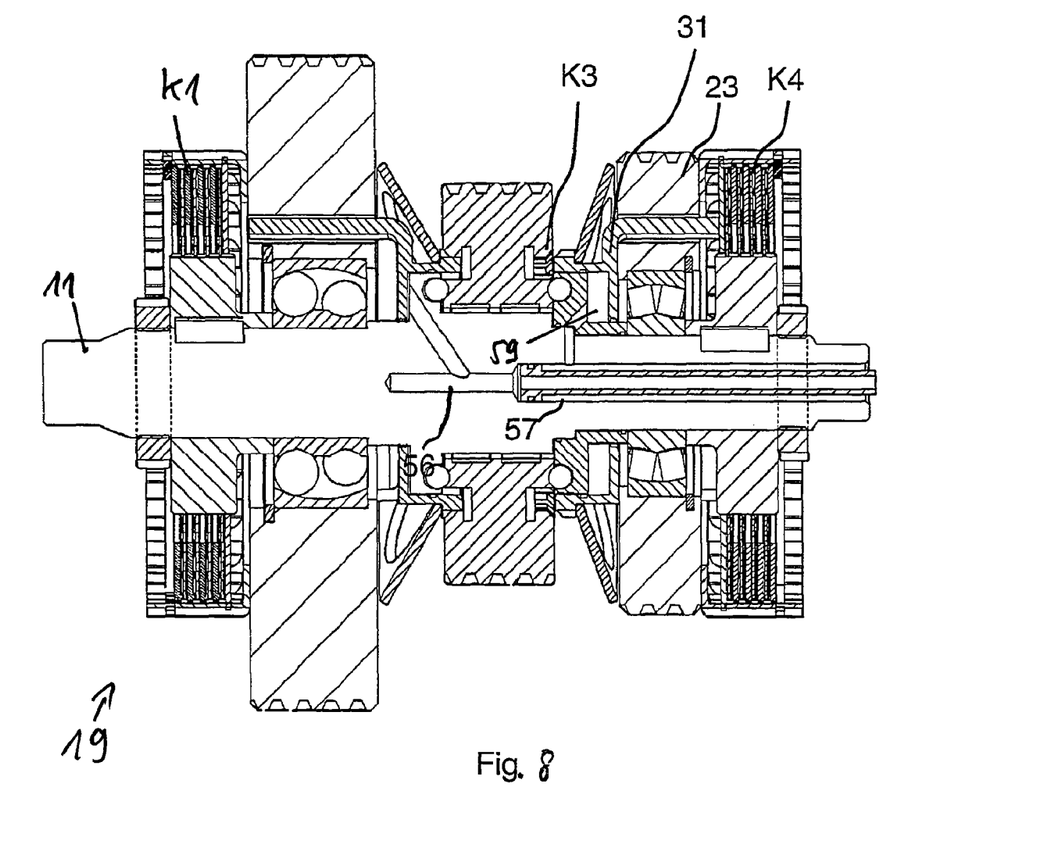
FIG. 8 shows an illustration similar to that according to FIG. 7 with the drive and output unit in the "LOW" driving range.

FIG. 8 shows the position of the drive and output unit 19 in the "LOW" driving range. In order to start the vehicle, pressure is built up in the fluid line 57. Said build-up of pressure in the pressure space 59 ensures that the dog rim part 31 is displaced axially and therefore the multi-disk clutch K4 is closed. The rotational movement of the multi-disk clutch K4 is transmitted to the gearwheel 1. The rotational force is transmitted via the torque transmission path (explained with reference to FIG. 2 of the drawing) to the gearwheel 4 and from there via the closed dog clutch K2 to the output wheel 7.

The engagement position of the dog clutch K3 is cancelled by the axial displacement of the dog rim part 31 by means of the pressure in the pressure space 59 and the output wheel 7 is in a rotational-force-transmitting engagement position only with the gearwheel 4 and the clutch K2.

Figure 9:
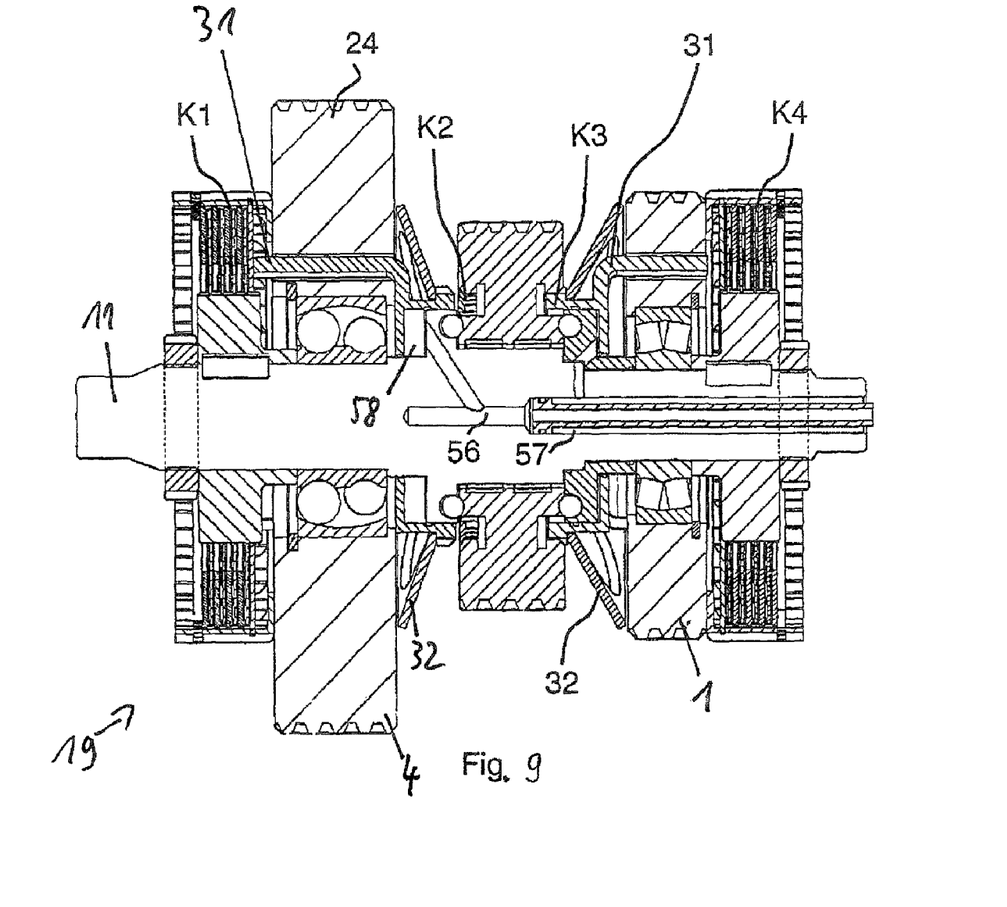
FIG. 9 shows an illustration similar to that according to FIG. 8 with the drive and output unit in the "HIGH" driving range.

FIG. 9 of the drawing shows the position of the drive and output unit 19 in the "HIGH" driving range. By means of pressurization of the pressure space 58 via the fluid line 56, the dog rim part 31 which is on the left in the plane of projection is displaced axially relative to the input shaft 11 in the direction of the multi-disk clutch K1. As a result, the multi-disk clutch K1 is closed and the dog clutch K2 is opened.

At the same time, at the synchronizing point, the pressurization of the pressure space 59 is dissipated via the fluid line 57 and the disk spring 32 which is on the right in the plane of projection displaces the associated dog rim part 31 to the left such that the multi-disk clutch K4 is opened and the dog clutch K3 is closed. The output wheel 7 is therefore in rotational-force-transmitting engagement with the gearwheel 1, and therefore the force transmission path explained together with FIG. 3 is produced in the vehicle transmission 18 according to the invention.

Figure 10:
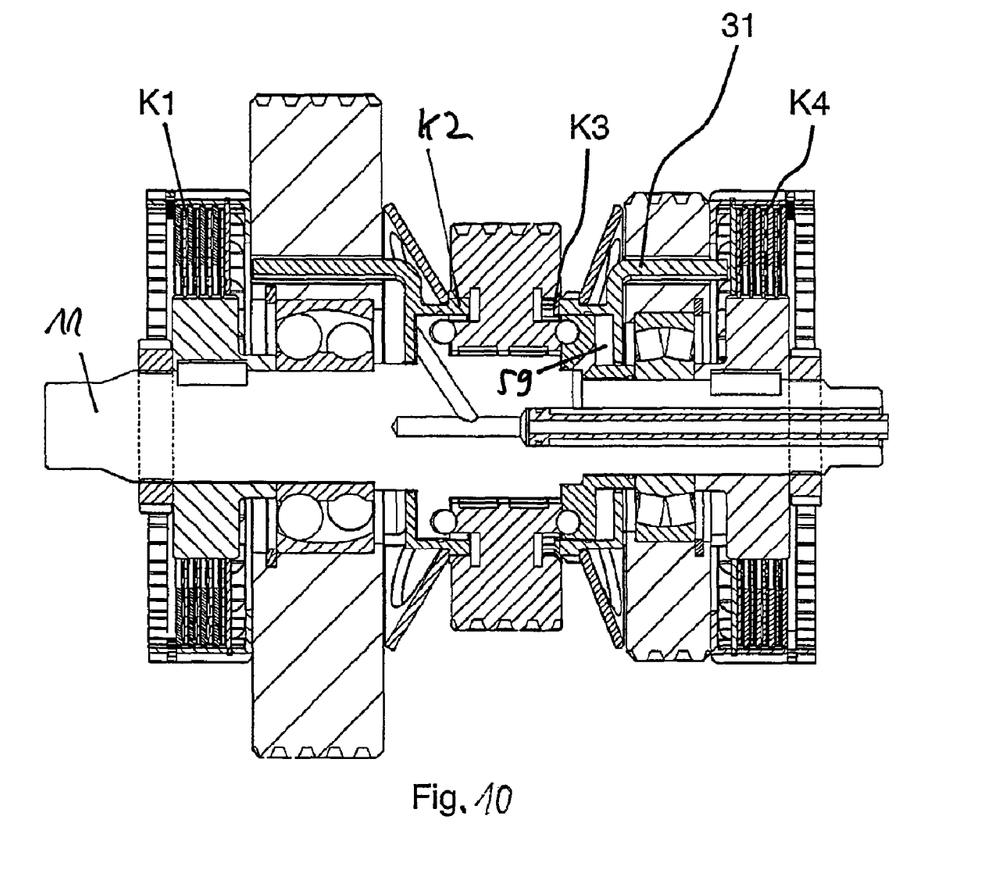
FIG. 10 shows an illustration similar to that according to FIG. 7 and FIG. 8 with the drive and output unit in the reverse travel driving range.

FIG. 10 of the drawing finally shows the position of the drive and output unit 19 in the reverse travel driving range of the vehicle transmission 18 according to the invention. The dog clutches K2 and K3 are opened by simultaneous pressurization of the pressure spaces 58, 59 and the multi-disk clutch K1 is closed in order to transmit torque. At the same time, the reverse driving clutch KR is closed in order to transmit torque to the turning stage 6.

The vehicle transmission according to the invention is now distinguished in that the spread of the continuously variable cone-pulley transmission contained therein can be passed through twice using only two hydraulically actuated devices which have two pressure spaces which are fed with hydraulic fluid via two rotary inlets on the input shaft of the vehicle transmission.

The number of components for opening and closing of the four clutches provided for the forwards travel has therefore been significantly reduced and the construction of the vehicle transmission simplified and also the construction space required by the vehicle transmission reduced.

With regard to features of the invention which have not been explained specifically in detail above, reference is furthermore made expressly to the claims and the drawing.

List of Designations

1 Gearwheel
2 Gearwheel
3 Gearwheel
4 Gearwheel
5 Gearwheel
6 Turning Stage
7 Output Wheel
8 Second Cone-Pulley Pair
9 First Cone-Pulley Pair
10 Gearwheel
11 Input shaft
13 Gearwheel
14 Gearwheel
15 First Shaft
16 Second Shaft
17 Endless Chain Belt
18 Vehicle Transmission
19 Drive and Output Unit
31 Dog Rim Part
32 Disk Spring
34 Bearing
35 Clutch Outer Rim
36 Steel Disks
39 Inner Clutch Rim
40 Adjustment Spring
41 Recesses
42 Dogs
43 Toothing
55 Pipe
56 Fluid Line
57 Fluid Line
58 Pressure Space
59 Pressure Space
K1 First Multi-Disk Clutch
K2 First Dog Clutch
K3 Second Dog Clutch
K4 Second Multi-Disk Clutch

The invention claimed is:

1. A vehicle transmission having a continuously variable transmission ratio, comprising:
   a first shaft;
   a second shaft;
   a first cone-pulley pair arranged on the first shaft;
   a second cone-pulley pair arranged on the second shaft;
   an endless chain belt arranged between the first cone-pulley pair and the second cone-pulley pair;
   an input shaft;
   a first dog clutch;
   a second dog clutch;
   an output wheel mounted rotatably on the input shaft, the input shaft can be brought into rotational engagement with the first shaft or the second shaft, and the output wheel can be brought into rotational engagement with the other of the first shaft or the second shaft by the first dog clutch or the second dog clutch;
   a first multi-disk clutch disk and a second multi-disk clutch for transmitting rotational force between the input shaft, the first shaft, the second shaft;
   a first hydraulically actuated device, which can actuate the first multi-disk clutch and the first dog clutch;
   a second hydraulically actuated device, which can actuate the second multi-disk clutch and the second dog clutch;
   a component; and
   a spring device,
   wherein the first hydraulically actuated device and the second hydraulically actuated device each have a pressure space which acts upon the component for closing the first multi-disk clutch and the second multi-disk clutch so as to displace the component axially relative to the input shaft and counter to the spring device.

2. The vehicle transmission as claimed in claim 1, further comprising two fluid lines extending coaxially along the input shaft, wherein the first hydraulically actuated device and the second hydraulically actuated device can be acted upon with hydraulic fluid by the two fluid lines.

3. The vehicle transmission as claimed in claim 1, further comprising two rotary inlets arranged in fluid communication with the input shaft, wherein hydraulic fluid can be applied by the two rotary inlets.

4. The vehicle transmission as claimed in claim 1, wherein the component has an engagement section for closing the first multi-disk clutch and the second multi-disk clutch which can be brought into a releasable, non-rotatable form-fitting engagement with the output wheel, and the engagement section is prestressed in a direction of the output wheel by the spring device.

5. The vehicle transmission as claimed in claim 4, further comprising a gearwheel supported against the spring device and arranged rotatably on the input shaft, between the first multi-disk clutch and the second multi-disk clutch and the spring device.

6. The vehicle transmission as claimed in claim 4, wherein axial displacement of the component in an operative direction for closing the first multi-disk clutch and the second multi-disk clutch leads to opening of an engagement position between the component and the output wheel.

7. The vehicle transmission as claimed in claim 5, wherein the gearwheel has recesses in an axial longitudinal direction which are penetrated by dogs that extend away from the component in an axial direction and act upon disks of the first multi-disk clutch and the second multi-disk clutch.

8. The vehicle transmission as claimed in claim 1, further comprising a gearwheel supported against the spring device and arranged rotatably on the input shaft, between the first multi-disk clutch and the second multi-disk clutch and the spring device.

9. The vehicle transmission as claimed in claim 8, wherein the gearwheel has recesses in an axial longitudinal direction which are penetrated by dogs that extend away from the component in an axial direction and act upon disks of the first multi-disk clutch and the second multi-disk clutch.

10. The vehicle transmission as claimed in claim 1, wherein axial displacement of the component in an operative direction for closing the first multi-disk clutch and the second multi-disk clutch leads to opening of an engagement position between the component and the output wheel.

11. The vehicle transmission as claimed in claim 1, further comprising a turning stage arranged in rotational engagement with the output wheel and a clutch which transmits rotational force from the second shaft to the turning stage.

* * * * *